United States Patent [19]

McCrory, III

[11] Patent Number: 5,365,797

[45] Date of Patent: Nov. 22, 1994

[54] DEVICE FOR MEASURING THE AMOUNT OF FORCE APPLIED TO A CABLE

[76] Inventor: Claud O. McCrory, III, 1161 Cotton Hill La., Collierville, Tenn. 38017

[21] Appl. No.: 178,867

[22] Filed: Jan. 7, 1994

[51] Int. Cl.⁵ .............................................. G01L 1/00
[52] U.S. Cl. ............................. 73/862.44; 73/862.391
[58] Field of Search ............. 73/158, 862.391, 862.44, 73/862.451, 862.453, 862.56, 862.541

[56] References Cited

U.S. PATENT DOCUMENTS

| | | |
|---|---|---|
| 28,295 | 6/1860 | Warren . |
| 380,294 | 3/1888 | Murdock . |
| 930,605 | 8/1909 | Moore . |
| 2,024,147 | 12/1935 | Curtiss ................... 73/862.44 |
| 2,025,928 | 12/1935 | Wunsch . |
| 2,491,251 | 12/1949 | Chinn . |
| 2,656,719 | 10/1953 | Webber . |
| 2,695,519 | 11/1954 | Lodge . |
| 2,826,065 | 5/1958 | Grimes . |
| 3,330,154 | 7/1967 | Habern . |
| 4,372,535 | 2/1983 | Gibson . |
| 4,390,301 | 6/1983 | Winckelhaus ................... 73/862.541 |
| 4,703,662 | 11/1987 | Gabelli et al. ................... 73/862.541 |
| 4,841,783 | 6/1989 | Marshek et al. ................ 73/862.453 |
| 5,181,426 | 1/1993 | Kovalsky ....................... 73/862.541 |
| 5,193,401 | 3/1993 | Bridges . |

Primary Examiner—Herbert Goldstein
Assistant Examiner—R. Biegel

[57] ABSTRACT

A device for measuring the pressure tension or pull force on a rope or cable. The device includes an elongated cable having a first end, a second end, and a midportion located between the first and second ends thereof; a support member; a pulley rotatably mounted on the support member, the pulley having an outer edge about which the midportion of the cable is wrapped; the pulley having a transverse slot through at least one edge thereof; the transverse slot having at least one opened end with opposing lips so that when the midportion of the cable is wrapped about the outer edge of the pulley and a pulling force is applied to one end of the cable, the opposing lips of the opened end of the slot will be urged toward one another an amount proportion to the pulling force applied to the cable; and a measuring mechanism for measuring the movement of the opposing lips of the opened end of the slot toward one another.

1 Claim, 2 Drawing Sheets

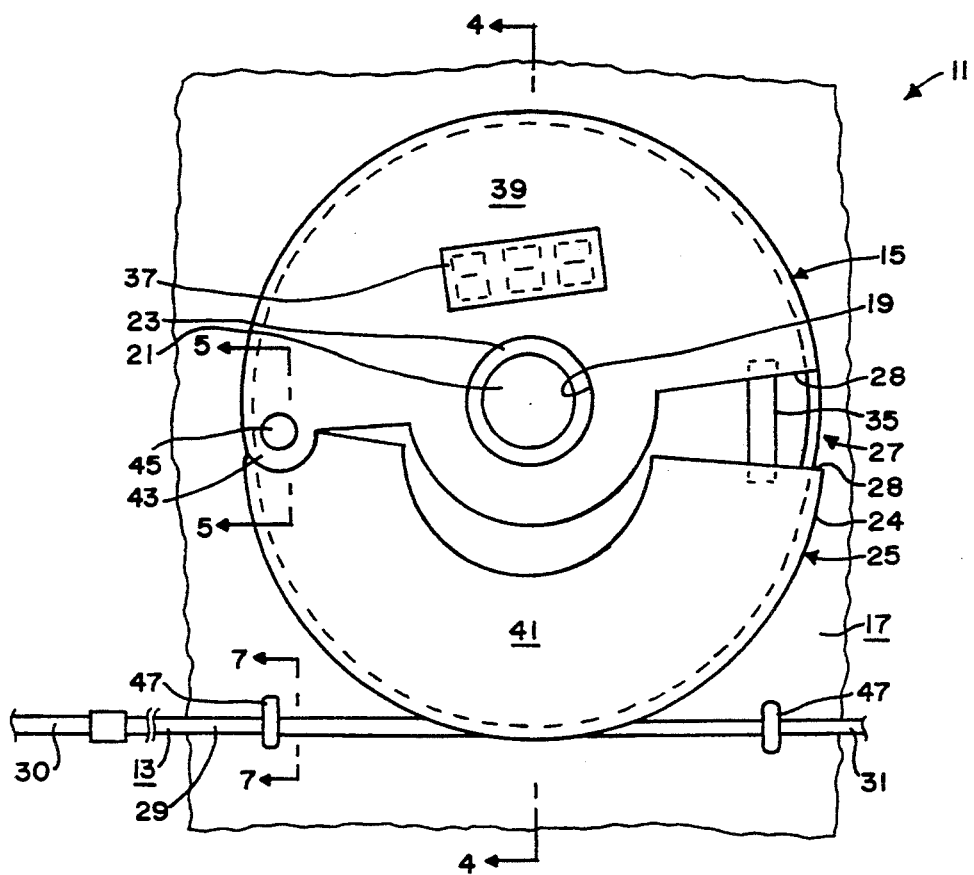

DEVICE FOR MEASURING THE AMOUNT OF FORCE APPLIED TO A CABLE

BACKGROUND OF THE INVENTION

1. Field of the Invention

The present invention relates, in general, to a device for measuring pressure tension or pull force on a rope or cable.

2. Information Disclosure Statement

A preliminary patentability search conducted in class 73 produced the following patents which appear to be relevant to the present invention:

Warren et al., U.S. Pat. No. 28,925, issued Jun. 26, 1860. The Warren et al. patent discloses a dynamometer for measuring the power transmitted by shafting to machinery. The Warren et al. dynamometer includes a first pulley fixedly attached to a shalt, a second pulley movably attached to a shaft, and one or more arms and spiral springs combining the two pulleys with a scale attached to one of the pulleys for indicating the relative power transmitted between the pulleys.

Murdock, U.S. Pat. No. 380,294, issued Mar. 27, 1888. The Murdock patent discloses a dynamometer for determining the force required to drive machines in an industrial establishment. The Murdock dynamometer includes a pulley loosely mounted on a shaft, a coil spring joining the pulley to the shaft so that when the shaft is rotated and resistance is applied to the pulley, the spring will be deflected and amount proportional to the resistance. A pointer is carried by the shaft for indicating how much the spring deflects.

Moore, U.S. Pat. No. 930,605, issued Aug. 10, 1909. The Moore patent discloses a transmission dynamometer including a rotary shaft, a first rotary member secured to the shaft, a second rotary member connected to the first rotary member by springs so that the force applied to or by the shaft is proportional to the amount that the springs deflect.

Wunsch et al. U.S. Pat. No. 2,025,928, issued Dec. 31, 1935. The Wunsch et al. patent discloses a hoisting mechanism including means for indicating the pull on the hoist rope or cable. The Wunsch et al. mechanism includes a support frame, a pivot support for one part of the frame and a resilient support for another part of the frame, a driving shaft rotatably supported by the frame, a winding drum carried on the shaft, a pulling cable secured to the drum, a lever associated with the frame and actuated by movement of the frame caused by a tangentially component of the torque of the driving shaft, and means connected to the lever for indicating the pull on the cable.

Chinn, U.S. Pat. No. 2,491,251, issued Dec. 13, 1949. The Chinn patent discloses a torsion dynamometer including a split annular spring, means or applying torque to the spring to effect a deflection of the adjacent ends of the spring relative to each other, an amount proportion to the torque, and valve means controlled by the deflection of the ends of the spring for varying the flow of a fluid according to the relative deflection of the ends of the spring.

Webber, U.S. Pat. No. 2,656,719, issued Oct. 27, 1953. The Webber patent discloses a traveling line load indicator for indicating the lifting load applied to tool hoisting lines or cables in deep well or mining operations. The Webber indicator includes a fulcrum, lever means pivotally mounted on the fulcrum, bearings provided on the lever means, a line wheel rotatably mounted in the bearings to receive a turn of a line thereabout whereby the line is adapted to depend from the wheel into a well and be supported on the wheel while travelling into or from the well, a load measuring device connected to the lever means and adapted to absorb the load imposed on the wheel by the line which tends to rotate the lever means about the fulcrum, the axis of the line wheel being slightly inclined relative to horizontal, and a guide wheel for guiding the line into substantially tangential contact with a lower portion of the periphery of the line wheel whereby the line may be passed substantially once around the line wheel and extend vertically therefrom into the well, the portion of the line between the guide wheel and the line wheel being spaced, by virtue of the inclination of the axis, from the portion of the line which depends from the line wheel.

Lodge, U.S. Pat. No. 2,695,519, issued Nov. 30, 1954. The Lodge patent discloses a tension indicator for measuring and regulating the tension of yarn ends as they are drawn from section beams or spools through a slasher onto a loom beam, etc. The Lodge tension indicator includes a pair of fixed rollers over which strands of yarn or the like are adapted to pass, a floating arm adapted to lie upon the strands and between the rollers, a transformer having a movable armature and a primary and secondary coil, means to transmit movement of the floating arm to move the armature, an electrical circuit connected to the transformer secondary coil and an electric meter connected in the circuit and thereby responsive to the positioning of the movable armature to indicate the tension of the strands.

Grimes, U.S. Pat. No. 2,826,065, issued Mar. 11, 1958. The Grimes patent discloses an apparatus for determining resistance of earth anchors embedded in soils against displacement under applied loads. The Grimes apparatus includes a rig frame, a boom attached to the rig frame, a cable attached to the anchor at substantially right angles thereto and at the center thereof, a source of power for tensioning the cable, a pulley sheave carried by the boom and receiving the cable, compression spring mountings for applying a predetermined force to the sheave opposite to the force applied to the sheave by the cable, the sheave being yieldable against the spring mountings when the force applied to the sheave by the cable exceeds the predetermined force applied by the spring mountings, and means adjacent to the sheave for indicating the amount of force on the cable which causes the sheave to move against the force of the springs, thereby measuring force imparted to the anchor by the source of power.

Habern et al., U.S. Pat. No. 3,330,154, issued Jul. 11, 1967. The Habern et al. patent discloses an apparatus for measuring the resultant load on a stationary shaft. The Habern apparatus includes a cylindrical shaft for being inserted through a rotatable member along the axis thereof and defining a cavity in an end thereof which is subject to incremental changes in dimensions in response to pressure variations exerted on the shaft by the rotatable member, the cavity being circular in cross-section and tapered inward from the end of the shaft concentric with the axis thereof, and a transducer disposed with the cavity having a pair of opposing curved ends abutting the walls of the cavity with the ends being tapered to match the taper of the cavity and being strained in response to the incremental changes in dimensions of the cavity, the transducer having strain gage means mounted thereon which is strained in proportion to the strain applied to the transducer.

Gibson et al., U.S. Pat. No. 4,372,535, issued Feb. 8, 1983. The Gibson et al. patent discloses a capstan winch for pulling cable through conduit, including means for measuring the torque applied to the capstan and a take-up reel. The torque measuring means includes an inner drum connected by a tension spring to a concentric outer drum. A patterned disc on the inner drum is visible through a window in the outer drum. The pattern indicates the relative position of the inner and outer drums, which is correlated to the applied torque.

Marshek et al., U.S. Pat. No. 4,841,783, issued Jun. 27, 1989. The Marshek et al. patent discloses a machine for measuring normal and tangential belt forces versus angular position for a flat belt drive. The Marshek et al. machine includes a normal force transducer driving pulley with two curved beams for measuring normal force, a tangential force transducer driven pulley with a cantilever beam for measuring tangential force, a torque disk connected to the driven pulley, first and second transverse sliding plates on which respectively the driving and driven pulleys each are separately mounted, input power supply means connected to the driving pulley to supply input power to the driving pulley, and means for applying belt initial tension through the second transverse sliding plate by applying tension to a first cord operatively connected to the second transverse sliding plate and wound at least partially on a roller.

Bridges, U.S. Pat. No. 5,193,401, issued Mar. 16, 1993. The Bridges patent discloses an apparatus for direct measurement of torque in an articulated joint including a driver assembly and a driven assembly with the driver assembly and driven assembly mounted on a common axis for enabling angular displacement of the driven assembly relative to the driver assembly about the common axis. An interlock is provided and is responsive to a remote actuator for rotating the driven assembly relative to the driver assembly. At least one force sensor is disposed in a position for transmitting rotational force from the interlock to the driven assembly and for measuring the rotational force in order to provide a torque measurement.

Nothing in the known prior art discloses or suggests the present invention. More specifically, nothing in the known prior art discloses or suggests a pull measuring device including an elongated cable having a first end, a second end, and a midportion located between the first and second ends thereof; a support member; a pulley rotatably mounted on the support member, the pulley having an outer edge about which the midportion of the cable is wrapped; the pulley having a transverse slot through at least one edge thereof; the transverse slot having at least one opened end with opposing lips so that when the midportion of the cable is wrapped about the outer edge of the pulley and a pulling force is applied to one end of the cable, the opposing lips of the opened end of the slot will be urged toward one another an amount proportion to the pulling force applied to the cable; and measuring means for measuring the movement of the opposing lips of the opened end of the slot toward one another.

SUMMARY OF THE INVENTION

The present invention provides a device for measuring pressure tension or pull force on a cable. A basic concept of the present invention is to provide a pulley with a transverse slot having at least one opened end which is urged closed when one end of a cable that is looped around the pulley is pulled, and with measuring means for measuring the movement of the opened end of the slot.

The device of the present invention includes, in general, an elongated cable having a first end, a second end, and a midportion located between the first and second ends thereof; a support member; a pulley rotatably mounted on the support member, the pulley having an outer edge about which the midportion of the cable is wrapped; the pulley having a transverse slot through at least one edge thereof; the transverse slot having at least one opened end with opposing lips so that when the midportion of the cable is wrapped about the outer edge of the pulley and a pulling force is applied to one end of the cable, the opposing lips of the opened end of the slot will be urged toward one another an amount proportion to the pulling force applied to the cable; and measuring means for measuring the movement of the opposing lips of the opened end of the slot toward one another.

In the preferred embodiment of the present invention, the pulley is preferably split into halves with a pivot joining the halves together at one end of the split and allowing the other, open end of the split, to freely swing open or closed. The measuring means is preferably positioned at the open end of the split between the two halves to measure the distance between the two halves at the open end of the split. The pulley is freely rotatably mounted on a base. A rope or cable is wrapped around both halves of the pulley. One end of the rope or cable may be secured to an electrical wire or the like to be pulled through a conduit or the like. Force is applied to the other end of the rope or cable to thereby pull the electrical wire or the like through the conduit or the like. As the rope or cable is pulled, the open end of the split of the pulley, will be forced together. The movement of the open end of the split is measured by the measuring device and can be read directly or converted into pull force or pressure tension.

BRIEF DESCRIPTION OF THE DRAWINGS

FIG. 3 is a front elevation view of the device of the present invention.

FIG. 4 is a sectional view substantially as taken on line 4—4 of FIG. 3.

FIG. 5 is a sectional view substantially as taken on line 5—5 of FIG. 3.

FIG. 6 is an exploded view of the components of FIG. 5.

FIG. 7 is a sectional view substantially as taken on line 7—7 of FIG. 3.

DESCRIPTION OF THE PREFERRED EMBODIMENT

Figure 1:
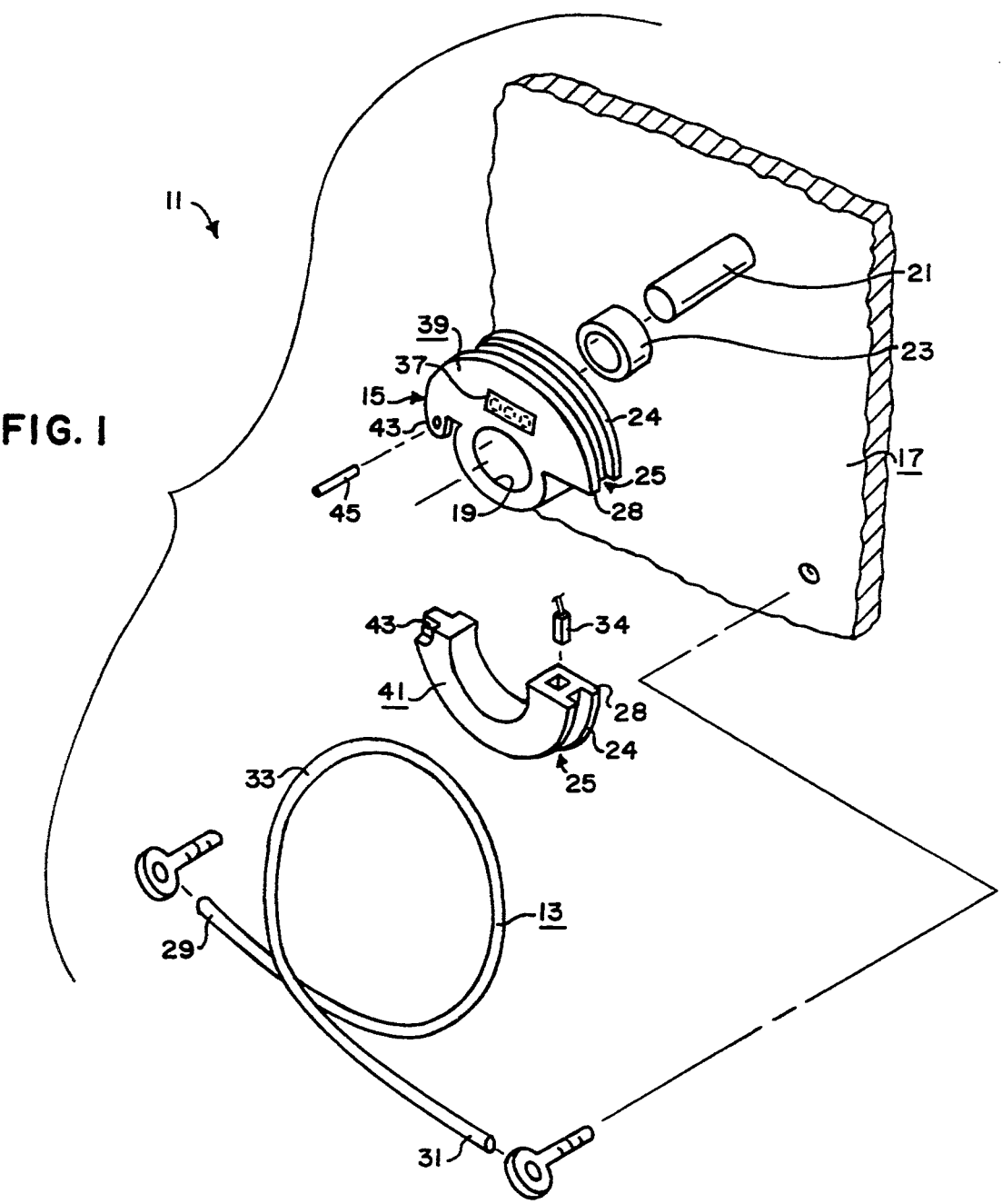
FIG. 1 is an exploded perspective view of the device of the present invention.

The preferred embodiment of the device of the present invention is shown in FIGS. 1-7, and identified by the numeral 11. The device 11 is especially designed to measure pressure tension or pull force on a rope or cable 13, or the like.

The device 11 includes a pulley 15 for being rotatably mounted on a support member or means such as a base 17 or the like. Thus, the pulley 15 preferably has a central aperture 19 for being rotatable attached to a stub axle 21 or the like which is, in turn, secured to the base 17. A conventional bearing 23 is preferably positioned between the axle 21 and the and the pulley 15 for allowing the pulley 15 to freely rotate about the axle 21.

The pulley 15 has an outer perimeter or edge 24 about which the cable 13 can be wrapped. The outer edge 24 preferably has a groove 25 therein for allowing the cable 13 to be held therein.

The pulley 15 has a transverse slot 27 extending through at least one side of the outer perimeter or edge 24 thereof. The transverse slot 27 has at least one opened end with opposing lips 28 so that so that when a first end 29 of the cable 13 is attached to the leading end of a electrical wire 30 or the like to be pulled through a conduit or the: like (not shown), when the other or second end 31 of the cable 13 is pulled, either manually or by way of a motorized winch or the like, and when a midportion 33 of the cable 13 is wrapped or looped about the outer edge 24 of the pulley 15, the opposing lips 28 of the opened end of the slot 27 will be forced together by an amount proportional to the pull force or pressure tension being applied to the cable 13 to pull the electrical wire 30 or the like through the conduit or the like as will not be apparent to those skilled in the art.

The device 11 includes measuring means 34 within the slot 27 for measuring the movement of the opposing lips 28 of the opened end of the slot 27 together and thereby measuring the pull force or pressure tension being applied to the cable 13 to pull the electrical wire 30 or the like through the conduit or the like as will not be apparent to those skilled in the art. The measuring means 34 may consist of a typical strain gauge or the like. However, the measuring means 34 preferably includes a common beam type or strain gauge load cell such as a Sensortronics model 60040 low profile bending beam load cell or a Sensortronics model 65023 low profile shear beam load cell, both manufactured by Sensortronics, 677 Arrow Grand Circle, Covina, Calif. 91722.

The device 11 preferably includes indicator means 35 for indicating the amount of force measured by the measuring means 34. The indicator means 35 may include a digital display means 37 to provide a digital display of the amount of force measured by the measuring means 34. The indicator means 35 may include alarm means for sounding or otherwise providing a signal with the force measured is above and/or below a desired amount. Such a indicator means is the model FV digital weight indicator manufactured by A&D Engineering, Inc., 1555 McCandless, Milpitas, Calif. 95035.

Figure 2:
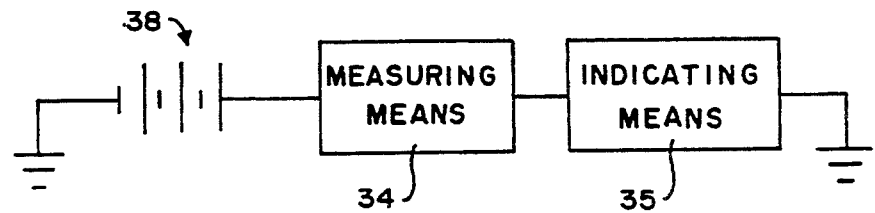
FIG. 2 is an electrical diagram of certain electrical components of the device of the present invention.

The measuring means 34 and indicator means 35 may be electrically coupled to a battery 38 or the like substantially as shown in FIG. 2. One or more switches and the like may be coupled to the electrical circuit for allowing the user to control the measuring means 34 and indicator means 35, etc., as will now be apparent to those skilled in the art.

The pulley 15 may be split into a generally circular first part 39 for being rotatably attached to the axle 21, and a generally circular second part 41 pivotally attached to the first part 39 to form a generally circular or wheel-like assembly with the slot 27 formed by the interface between the first and second parts 39, 41. Thus, one edge of each part 39, 41 may be provided with ear members 43 and a pivot pin 45 may be provided to extend through each ear member 43 (see, in general, FIGS. 5 and 6) to thereby pivotally attach the two parts 39, 41 together.

Guide members 47 such as eyebolts or the like may be attached to the base 17 to guide the cable 13 around the pulley 15.

To use the device 11, the midportion 33 of the cable 13 is merely passed or wrapped around the groove 25 in the pulley 15. The first end 29 of the cable 13 is secured to the electrical wire 30 or the like to be pulled through a conduit or the like. Force can then be applied to the second end 31 of the cable 13, either manually or by a motorized winch or the like, to pull the electrical wire 30 or the like through the conduit or the like. As force is applied to the second end 31 of the cable 13, the slot 27 will be forced closed by an amount proportional to the force applied to the second end 31 of the cable 13. The measuring means 34 will then measure the force closing the slot 27 and the indicator means 35 will indicate the amount of force measured.

Although the present invention has been described and illustrated with respect to preferred embodiments and preferred uses therefor, it is not to be so limited since modifications and changes can be made therein which are within the full intended scope of the invention.

I claim:

1. A device comprising, in combination:
   (a) an elongated cable having a first end, a second end, and a midportion located between said first and second ends thereof;
   (b) a support member; said support member including a stub axle;
   (c) a pulley rotatably mounted on said support member, said pulley having an outer edge about which said midportion of said cable is wrapped; said pulley having a slot through said outer edge thereof; said slot being transverse to the axis of rotation of said pulley; said slot having at least one opened end with opposing sides so that when said midportion of said cable is wrapped about said outer edge of said pulley and a force is applied to one end of said cable, said opposing sides of said opened end of said slot will be urged toward one another an amount proportion to the force applied to said cable; said pulley including a generally semicircular first part for being rotatably attached to said stub axle, and a generally semicircular second part for being positioned adjacent said first part to form a generally circular assembly;
   (c) measuring means for measuring the movement of said opposing sides of said opened end of said slot toward one another to indicate the amount of force applied to said cable; and
   (d) pivot means for pivotally attaching said first and second parts of said pulley to one another.

* * * * *